US012736479B2

(12) United States Patent
Lee et al.

(10) Patent No.: US 12,736,479 B2
(45) Date of Patent: Sep. 15, 2026

(54) SEMICONDUCTOR MEASUREMENT APPARATUS

(71) Applicant: Samsung Electronics Co., Ltd., Suwon-si (KR)

(72) Inventors: Donggun Lee, Suwon-si (KR); Jaewon Lee, Suwon-si (KR); Jinwoo Ahn, Suwon-si (KR); Juntaek Oh, Suwon-si (KR); Eunsoo Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 18/317,387

(22) Filed: May 15, 2023

(65) Prior Publication Data

US 2024/0125709 A1 Apr. 18, 2024

(30) Foreign Application Priority Data

Oct. 18, 2022 (KR) ........................ 10-2022-0133857

(51) Int. Cl.
*G01N 21/88* (2006.01)
*G01N 21/47* (2006.01)
(Continued)

(52) U.S. Cl.
CPC ......... *G01N 21/8806* (2013.01); *G01N 21/47* (2013.01); *G01N 21/55* (2013.01); *G01N 21/9501* (2013.01); *G01N 2021/8845* (2013.01)

(58) Field of Classification Search
CPC .... G01N 21/8806; G01N 21/47; G01N 21/55; G01N 21/9501; G01N 2021/8845;
(Continued)

(56) References Cited

U.S. PATENT DOCUMENTS 4,253,765 A * 3/1981 Kato .................... G01J 3/2803 356/328
10,254,644 B2 4/2019 Quintanilha et al.
(Continued)

FOREIGN PATENT DOCUMENTS

KR 20200100166 A 8/2020
WO 2021180540 A1 9/2021

*Primary Examiner* — Monica T Taba
(74) *Attorney, Agent, or Firm* — Wolf, Greenfield & Sacks, P.C.

(57) ABSTRACT

A semiconductor measurement apparatus includes an illuminator configured to output light having a first wavelength band and light having a second wavelength band, different from the first wavelength band, a stage on which a test object is positioned, a camera configured to receive light reflected or scattered from the test object or transmitted through the test object, and a controller configured to control the illuminator and the camera, and to measure, based on information indicated by the light received by the camera, a plurality of structures included in the test object. The controller is configured to set an exposure time of the camera to a first exposure time while the illuminator outputs the light having the first wavelength band, and to set the exposure time of the camera to a second exposure time, different from the first exposure time, while the illuminator outputs the light having the second wavelength band.

20 Claims, 15 Drawing Sheets

(51) Int. Cl.
*G01N 21/55* (2014.01)
*G01N 21/95* (2006.01)

(58) Field of Classification Search
CPC .. G01N 21/211; G01N 21/31; G01N 21/8851; G01N 2021/8848; G03F 7/70633; H01L 22/12; G01B 11/00; G01B 11/24; G01B 11/272; G03B 7/08
See application file for complete search history.

(56) References Cited

U.S. PATENT DOCUMENTS

2003/0020929 A1 1/2003 Morath et al.
2009/0135419 A1* 5/2009 Finarov ................. G01J 3/2803 356/319
2013/0169966 A1 7/2013 Shchegrov et al.
2019/0195782 A1 6/2019 Shchegrov et al.
2020/0371441 A1 11/2020 Tel et al.
2021/0166375 A1 6/2021 Pandev
2021/0344827 A1* 11/2021 Van Hoey .............. H04N 23/10
2022/0034791 A1* 2/2022 Zhang ................ G01N 21/8422
2022/0313062 A1* 10/2022 Polejaev ................... G01J 3/28
2023/0034494 A1* 2/2023 Fernandez-Dorado ...................... G01N 21/8806

* cited by examiner

SEMICONDUCTOR MEASUREMENT APPARATUS

CROSS-REFERENCE TO RELATED APPLICATION(S)

This application claims benefit of priority to Korean Patent Application No. 10-2022-0133857 filed on Oct. 18, 2022, in the Korean Intellectual Property Office, the disclosure of which is incorporated herein by reference in its entirety.

FIELD

The present disclosure relates to a semiconductor measurement apparatus.

BACKGROUND

A semiconductor measurement apparatus, which may refer to an apparatus that can measure a critical dimension of a structure in a sample including a structure formed by a semiconductor process, may measure an overlay and a critical dimension using ellipsometry or the like. In general, ellipsometry includes a process of irradiating light having a plurality of wavelength bands on a test object, and measuring an intensity of the light reflected from a sample using an image sensor. However, an intensity of the light output by an illuminator may vary depending on a wavelength band thereof. As such, the intensity of the light measured by the image sensor may vary depending on the wavelength band regardless of the test object, which may result in a decrease in measurement accuracy.

SUMMARY

An aspect of the present disclosure provides a semiconductor measurement apparatus capable of setting an exposure time of the camera to vary depending on a wavelength band of light irradiated onto a test object to allow a camera to compensate for an output difference of an illuminator according to the wavelength band, thereby more accurately determining an overlay and/or a critical dimension from the test object.

According to an aspect of the present disclosure, there is provided a semiconductor measurement apparatus including an illuminator configured to provide output light including first light having a first wavelength band and second light having a second wavelength band, different from the first wavelength band, a stage configured to position a test object such that the output light from the illuminator is incident thereon, a camera configured to receive light reflected or scattered from the test object or transmitted through the test object, and a controller configured to control the illuminator and the camera, and to measure, based on information determined from the light received by the camera, a plurality of structures included in the test object. The controller may be configured to set an exposure time of the camera to a first exposure time while the illuminator outputs the first light having the first wavelength band, and to set the exposure time of the camera to a second exposure time, different from the first exposure time, while the illuminator outputs the second light having the second wavelength band.

According to another aspect of the present disclosure, there is provided a semiconductor measurement apparatus including an illuminator configured to emit output light, a stage configured to position a test object such that the output light from the illuminator is incident thereon, a camera configured to receive light reflected or scattered from the test object or transmitted through the test object, and a controller configured to measure an intensity of a signal output by the camera responsive to setting an exposure time of the camera to a reference exposure time and setting a wavelength band of the output light from the illuminator to each of a plurality of wavelength bands. The controller may be configured to compare intensity of respective signals output by the camera in each of the plurality of wavelength bands with a predetermined target intensity, and to determine exposure times of the camera responsive thereto, wherein the respective exposure times for at least some of the plurality of wavelength bands are different from each other.

According to another aspect of the present disclosure, there is provided a semiconductor measurement apparatus including an illuminator configured to emit output light having one of a plurality of wavelength bands, a camera configured to receive the output light, and a controller configured to control the illuminator and the camera. When the camera receives the output light that is emitted from the illuminator and is reflected or scattered from a bare wafer or is transmitted through the bare wafer, the controller may be configured to determine, based on an intensity of a first signal generated by the camera in response to the output light, a plurality of individual exposure times respectively matched to the plurality of wavelengths bands. The controller may be configured to acquire a second signal from the camera while setting an exposure time of the camera to a respective one of the plurality of individual exposure times sequentially and controlling the illuminator to emit the output light having a wavelength band among the plurality of wavelength bands, which is matched to the respective one of the plurality of individual exposure times set in the camera. The controller may be configured to measure, based on the second signal, a plurality of structures on a test object.

According to example embodiments of the present disclosure, considering that an intensity of light, output by an illuminator, changes depending on a wavelength band thereof, an exposure time of a camera (which is positioned to receive light reflected or scattered from a test object or transmitted through the test object) may be changed depending on a wavelength band of light irradiated by the illuminator onto the test object. Accordingly, a signal intensity difference of the camera caused by an output difference of the illuminator according to a wavelength band may be compensated, thereby improving the repeatability and reproducibility of a semiconductor measurement apparatus, and more accurately determining an overlay and/or a critical dimension from the test object.

The various and beneficial advantages and effects of the present disclosure are not limited to the above description, and will be more understood in the course of describing specific example embodiments of the present disclosure.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, preferred example embodiments of the present disclosure will be described with reference to the accompanying drawings. The terms "comprises," "comprising," "includes" and/or "including," when used herein, specify the presence of stated elements, but do not preclude the presence of additional elements. The term "and/or" includes any and all combinations of one or more of the associated listed items.

Figure 1A:
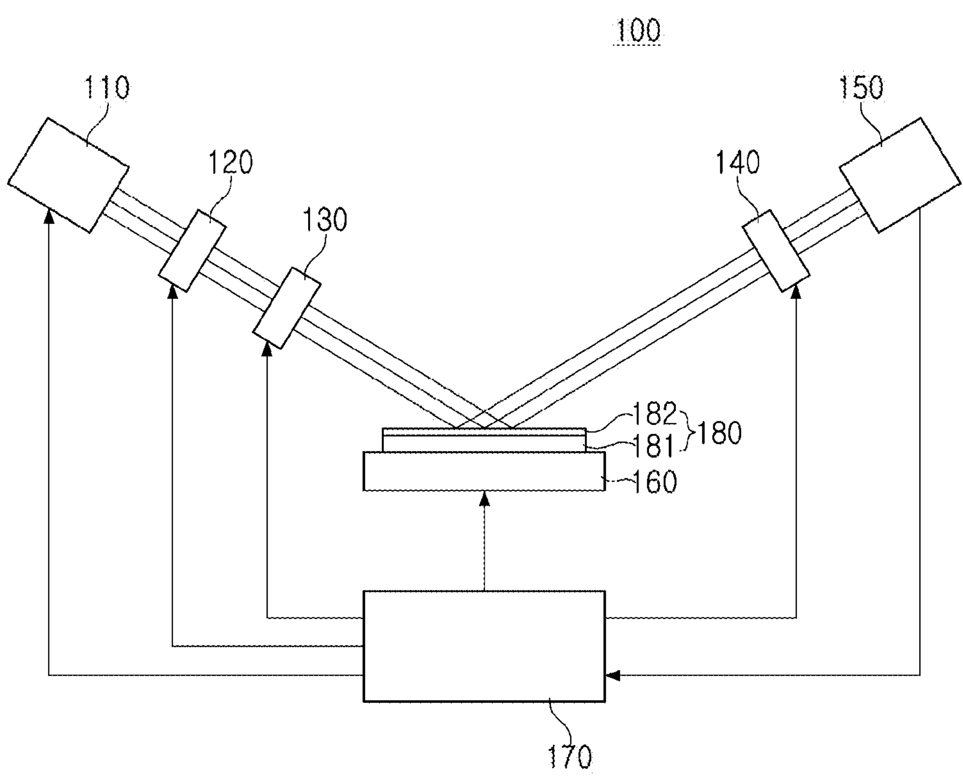
FIGS. 1A, 1B, and 1C are schematic diagrams illustrating a semiconductor measurement apparatus according to an example embodiment of the present disclosure.
Figure 1B:
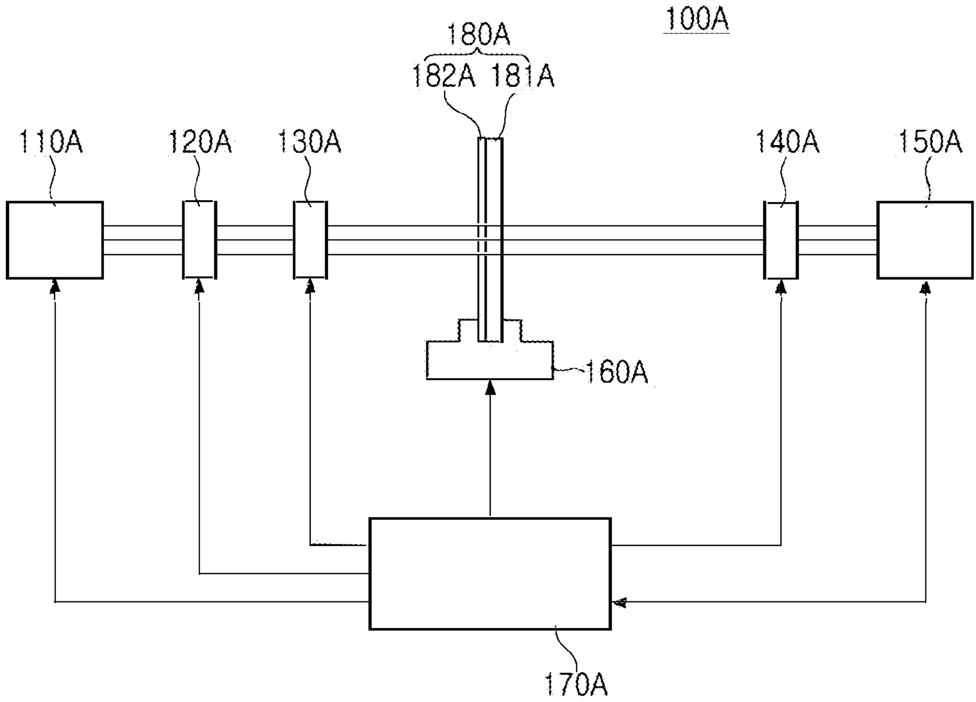
Figure 1C:
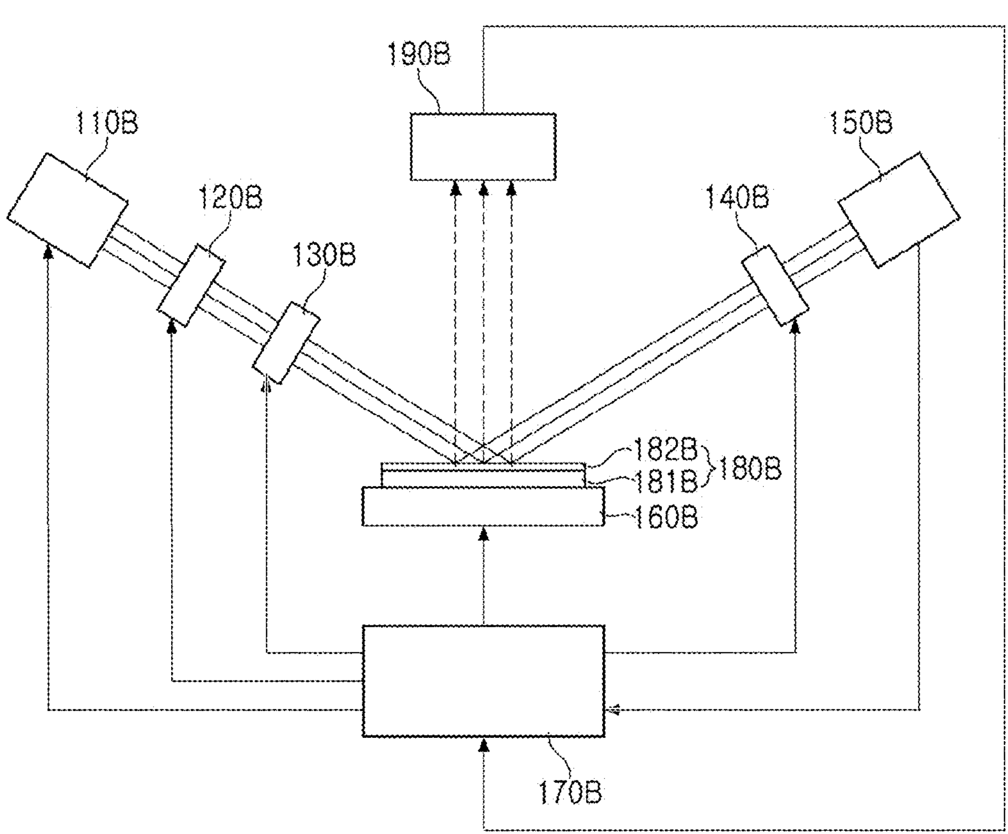

FIGS. 1A to 1C are schematic diagrams illustrating a semiconductor measurement apparatus according to an example embodiment of the present disclosure.

Referring to FIGS. 1A to 1C, a semiconductor measurement apparatus 100 or 100A or 100B according to an example embodiment may be a device using ellipsometry. Referring to FIG. 1A, the semiconductor measurement apparatus 100 may include an illuminator 110, a first polarizer 120, a compensator 130, a second polarizer 140, a camera 150, and the like. The terms "first," "second," etc., may be used herein merely to distinguish one component, layer, direction, etc. from another. Light output by the illuminator 110 may be irradiated onto a test object 180 positioned on a stage 160, and the camera 150 may receive light reflected from the test object 180. The controller 170 may measure a critical dimension, an overlay, and the like of a structure included in the test object 180 using a signal through which the camera 150 receives and outputs light, that is, based on a signal output from the camera 150 responsive to the light irradiated onto and reflected from the test object 180.

The semiconductor measurement apparatus 100A according to an example embodiment illustrated in FIG. 1B may also include an illuminator 110A, a first polarizer 120A, a compensator 130A, a second polarizer 140A, and a camera 150A. However, in the example embodiment illustrated in FIG. 1B, light output by the illuminator 110A may be transmitted through a test object 180A positioned on a stage 160A to be incident on the camera 150A. The controller 170A may perform a measurement operation on the test object 180A by analyzing the light transmitted through the test object 180A and incident on the camera 150A or by analyzing the signal output from the camera 150A responsive to the light irradiated onto and transmitted through the test object 180A. Hereinafter, components and operations of the semiconductor measurement apparatus 100 according to an example embodiment illustrated in FIG. 1A will be described. The detailed description of the semiconductor measurement apparatus illustrated in FIG. 100 may be similarly applied to the semiconductor measurement apparatus 100A illustrated in FIG. 1B, except that the light reflected from the test object 180 is incident on the camera 150 and the light transmitted through the test object 180A is incident on the camera 150A.

The illuminator 100 may include at least one light source, and the light source may output light covering (or including wavelengths that fall within) a wide wavelength band. As an example, the light output by the light source (also referred to herein as output light) may be light having a wavelength from an ultraviolet wavelength to an infrared wavelength. The illuminator 100 may further include a monochromator separating and emitting light having a specific wavelength band from the light output by the light source. As an example, a grating structure may be included in the monochromator. The monochromator may irradiate light onto the test object 180 while changing a wavelength band of the light emitted by the light source, and thus light having various wavelength bands may be reflected from the test object 180 to be incident on the camera 150. In the example embodiment illustrated in FIG. 1B, light having various wavelength bands may be transmitted through the test object 180A to be incident on the camera 150A.

The first polarizer 120 may polarize the light output by the illuminator 110 in a predetermined polarization direction, and may emit the polarized light. In an example embodiment, the first polarizer 120 may include at least one illumination polarization device, and a wave plate. As an example, the illumination polarization device may be a polarizer, and the wave plate may be a half wave plate, a quarter wave plate, and the like. In some example embodiments, the number of illumination polarization devices and the number of wave plates may vary. The compensator 130 may adjust or delay a phase of light passing through the first polarizer 120.

Light reflected from the test object 180 may pass through the second polarizer 140 to be incident on the camera 150. The second polarizer 140 may include at least one polarization device and an analyzer. The camera 150 may include an image sensor, and may output a signal in response to light reflected from the test object 180. The controller 170 may determine critical dimensions, overlays, and the like of structures included in the test object 180 using a signal output by the camera 150. As an example, the controller 170 may determine, using a signal output by the camera 150, an intensity of light, a reflectance of or indicated by light reflected from the test object 180, an intensity difference and phase difference between polarization components included in the light reflected from the test object 180, and the like. The controller 170 may measure structures included in the test object 180 using at least one of the intensity difference and phase difference between the polarization components, and the reflectance.

The test object 180 seated on the stage 160 may include a wafer 181 (or 181A or 181B) and at least one layer 182 (or 182A or 182B) formed on the wafer 181. A plurality of structures may be formed on the wafer 181 and the layer 182, and the controller 170 may determine an overlay, an alignment state of the structures formed on the wafer 181 and the layer 182, using a signal transmitted from the camera 150, or may determine critical dimensions of the structures.

As described above, the light source included in the illuminator 110 may output light having a wide wavelength band, and light having a specific wavelength band may be selectively incident on the test object 180 from the light output by the light source by a monochromator or the like. However, an intensity of the light output by the light source may vary depending on a wavelength band thereof, and thus, properties of a signal output by the camera 150, for example, a signal-to-noise ratio may vary depending on a wavelength band of light.

As an example, the intensity of light output by the light source may be relatively weak in a first wavelength band close to an ultraviolet wavelength band. In this case, a signal-to-noise ratio of a signal output by the camera 150 when the monochromator selects light having the first wavelength band may be more degraded than a signal-to-noise ratio of a signal output by the camera 150 when the monochromator selects light having a second wavelength band longer than the first wavelength band. A distribution of measurement results determined by the controller 170 when the light having the first wavelength band is irradiated onto the test object 180 may be greater than a distribution of measurement results determined by the controller 170 when the light having the second wavelength band is irradiated onto the test object 180. As a result, when the light having the first wavelength band is irradiated onto the test object 180, the repeatability of the semiconductor measurement apparatus 100 may be lowered.

In an example embodiment of the present disclosure, in order to address the above-described issue, the controller 170 may dynamically control an exposure time of the camera 150 with reference to a wavelength band of light incident on the test object 180. As an example, assuming the above-described example, the controller 170 may set the exposure time of the camera 150 when the light having the first wavelength band is incident on the test object 180 to be longer than the exposure time of the camera 150 when the light having the second wavelength band is incident on the test object 180. The exposure time of the camera 150 may be set to be relatively long in a wavelength band in which intensity of light is weak, such that the controller 170 may acquire a signal with a higher or optimal signal-to-noise ratio in each wavelength band, and may improve the repeatability and reproducibility or consistency of the semiconductor measurement apparatus 100.

In addition, the exposure time of the camera 150 may be dynamically controlled depending on an intensity of each wavelength band of light output by the illuminator 110, thereby implementing illuminator 110 with a small number of light sources or only one light source. In an example embodiment of the present disclosure, a signal-to-noise ratio of a signal received by the controller 170 may be improved by adjusting the exposure time, instead of configuring the illuminator 110 with a plurality of light sources outputting light having strong intensity in a specific wavelength band and maintaining a constant exposure time of the camera 150. Accordingly, as compared to a structure in which the illuminator 110 includes a plurality of light sources, the semiconductor measurement apparatus 100 having high repeatability and reproducibility may be implemented at low cost.

Finally, the semiconductor measurement apparatus 100B illustrated in FIG. 1C may operate similarly to the semiconductor measurement apparatus 100 illustrated in FIG. 1A. The semiconductor measurement apparatus 100B according to an example embodiment illustrated in FIG. 1C may also include an illuminator 110B, a first polarizer 120B, a compensator 130B, a second polarizer 140B, and a camera 150B. However, in the example embodiment illustrated in FIG. 1C, the semiconductor measurement apparatus 100B may further include a sub-camera 190B positioned above a test object 180B positioned on a stage 160B. The sub-camera 190B may detect light scattered from the test object 180B and output a signal to the controller 170B. For example, the controller 170B may determine distribution of light reflected and scattered from a surface of the test object 180B using a signal received from the camera 150B and the sub-camera 190B, and may determine a defect or the like present in the test object 180B based thereon.

Figure 2A:
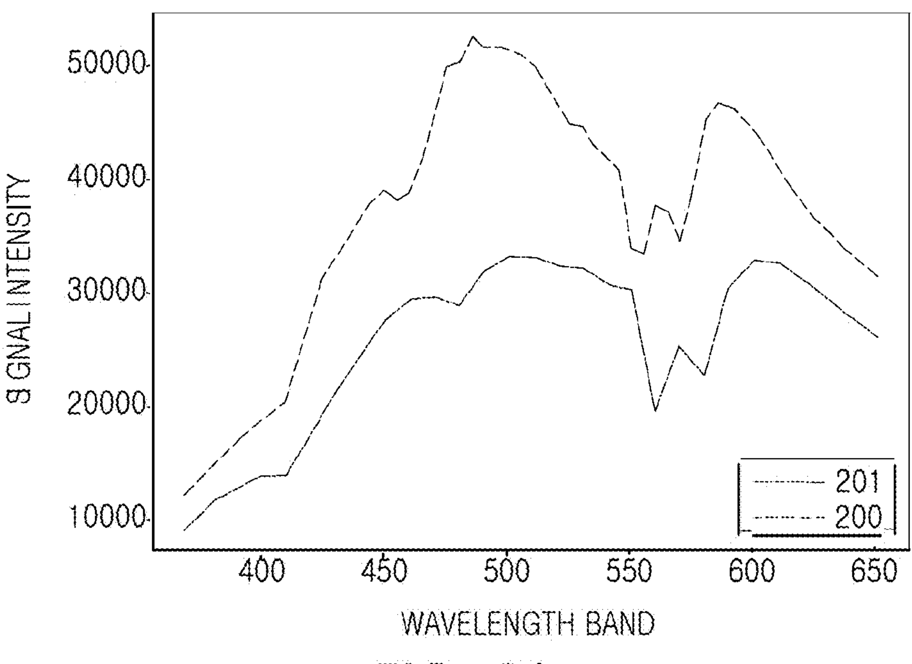
FIGS. 2A and 2B are diagrams illustrating a method of operating a semiconductor measurement apparatus according to an example embodiment of the present disclosure.
Figure 2B:
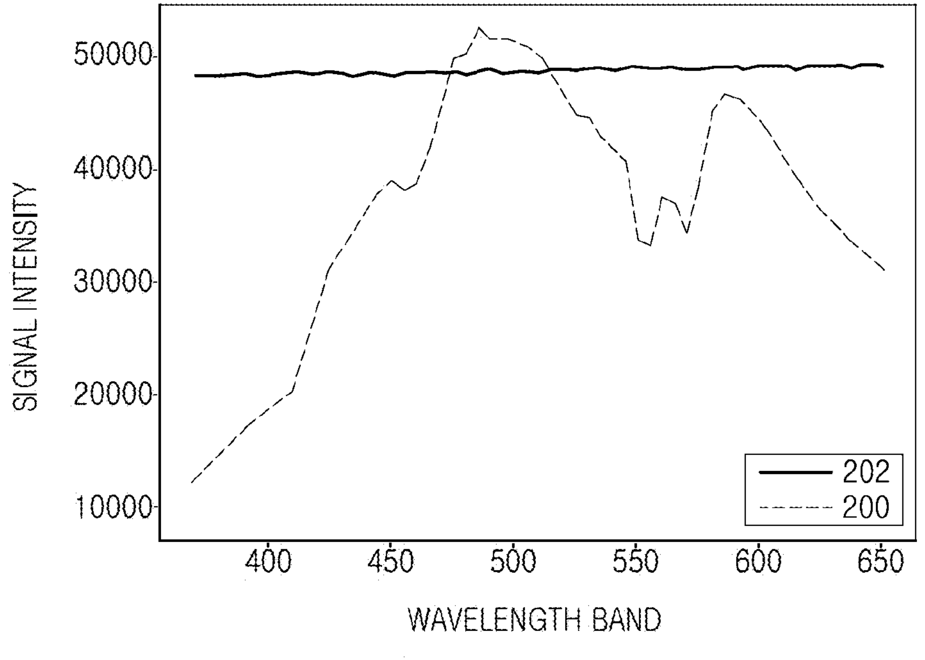

FIGS. 2A and 2B are diagrams illustrating a method of operating a semiconductor measurement apparatus according to an example embodiment of the present disclosure.

In FIGS. 2A and 2B, a horizontal axis may correspond to a wavelength band of light output by an illuminator, and a vertical axis may correspond to an intensity of a signal generated by a camera in response to light reflected from or transmitted through a test object and incident on the camera. A first graph 200 and a second graph 201 of FIG. 2A may be graphs illustrating an intensity of a signal output by a camera for each wavelength band when light is irradiated on a test object using different illuminators. As an example, in each of the first graph 200 and the second graph 201, an illuminator may include a white light source and may emit light covering a wavelength band from an ultraviolet wavelength to an infrared wavelength. A signal intensity in each of the first graph 200 and the second graph 201 may be a result of measurement performed by setting both a polarizer and an analyzer to 0 degrees.

As illustrated in FIG. 2A, an intensity of a signal output by a camera may vary according to a wavelength band of light output by an illuminator. In the first graph 200, a signal intensity may decrease in a short wavelength band close to an ultraviolet wavelength band, the signal intensity may have a maximum value in a wavelength band near 500 nm, and the signal intensity may decrease in a wavelength band near 550 nm corresponding to yellow. In addition, as a distance between a wavelength band and an infrared wavelength band decreases, the signal intensity may be weakened. In other words, the signal intensity may weaken as wavelengths approach the ultraviolet and infrared wavelength ranges. Even in the illuminator corresponding to the second graph 201, a signal intensity according to a wavelength band may have a pattern similar to that of the first graph 200.

Accordingly, when the semiconductor measurement apparatus is configured using the illuminator corresponding to the first graph 200 or the second graph 201, a signal-to-noise ratio of a signal output when light having a wavelength band close to an ultraviolet wavelength band is irradiated onto a test object may be more degraded than a signal-to-noise ratio of a signal output when light having a wavelength band of 500 nm or thereabout is irradiated onto the test object. As a result, the repeatability of a measurement value output by the semiconductor measurement apparatus when light having a first wavelength band is irradiated may be relatively lowered.

In an example embodiment of the present disclosure, in order to address the above-described issue, an exposure time of a camera may vary depending on a wavelength band of light output by an illuminator. Referring to FIG. 2B, unlike the first graph 200, in a third graph 202, a signal intensity according to a wavelength band of light may be maintained to be relatively constant. That is, the intensity of a signal output from a camera may be substantially consistent or uniform regardless of the wavelength band of the output light from the illuminator. Such a result may be obtained by varying the exposure time of the camera while maintaining the illuminator.

For example, when light having a first wavelength band close to an ultraviolet wavelength band is irradiated onto a test object, an exposure time of a camera may be set to a first exposure time. When light having a second wavelength band close to 500 nm is irradiated onto the test object, the exposure time of the camera may be set to a second exposure time. The first exposure time may be longer than the second exposure time. Thus, an intensity of a signal output by the camera may not have a significant difference (i.e., may be substantially constant) between the first wavelength band and the second wavelength band.

A method of determining an individual exposure time according to a wavelength band may vary depending on a structure of an optical system included in the semiconductor measurement apparatus. For example, when the semiconductor measurement apparatus includes a reflective optical system, an optimal individual exposure time according to a wavelength band may be determined while allowing light output by an illuminator to be reflected from a bare wafer and then to be incident on the camera. Conversely, when the semiconductor measurement apparatus includes a transmission optical system, the optimal individual exposure time according to the wavelength band may be determined in an environment in which light output by the illuminator passes through air to be directly incident on the camera (i.e., without passing through or being reflected by intervening elements or components) or indirectly incident on the camera (i.e., by passing through the test object). As an example, an exposure time according to a wavelength band may be determined as indicated by the ratio shown in Equation 1 below.

Reference Exposure time: Reference Intensity=Individual Exposure time: Target Intensity [Equation 1]

As an example, referring to FIG. 2B, in a wavelength band of 400 nm, a reference intensity of a signal output when a camera set to a reference exposure time receives light may be less than a target intensity. A controller of the semiconductor measurement apparatus may calculate an individual exposure time longer than the reference exposure time in consideration of a ratio between the reference intensity and the target intensity, and may set the calculated individual exposure time as an exposure time for the wavelength band of 400 nm.

As an example, the controller may consider whether an image sensor included in the camera is saturated when setting an individual exposure time for each wavelength band. Referring to FIG. 2B as an example, in a wavelength band of 500 nm, the illuminator may output light having very strong intensity, and thus, the image sensor included in the camera may be saturated. Accordingly, the reference intensity may be greater than the target intensity, and the controller may set an individual exposure time for the wavelength band of 500 nm to be shorter than the reference exposure time.

Figure 3:
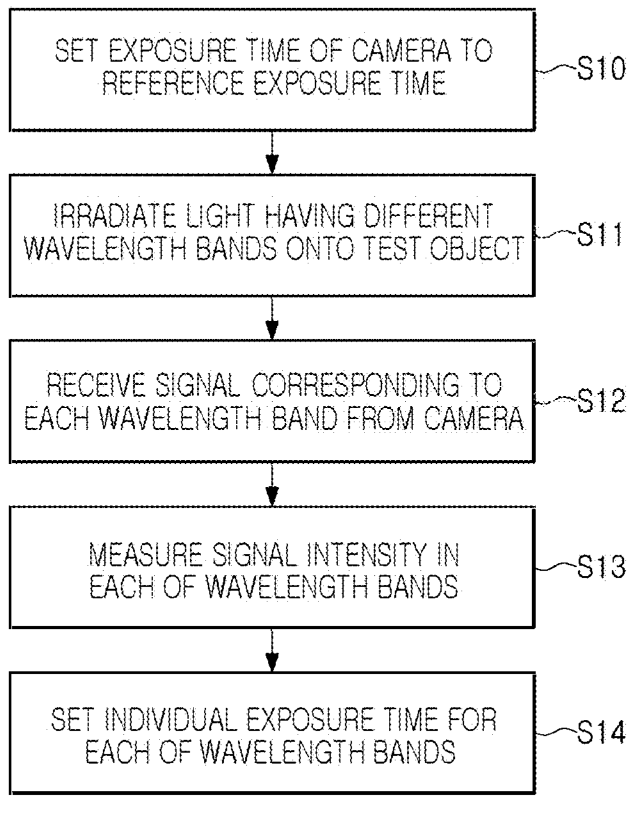
FIGS. 3 and 4 are flowcharts illustrating a method of operating a semiconductor measurement apparatus according to an example embodiment of the present disclosure.
Figure 4:
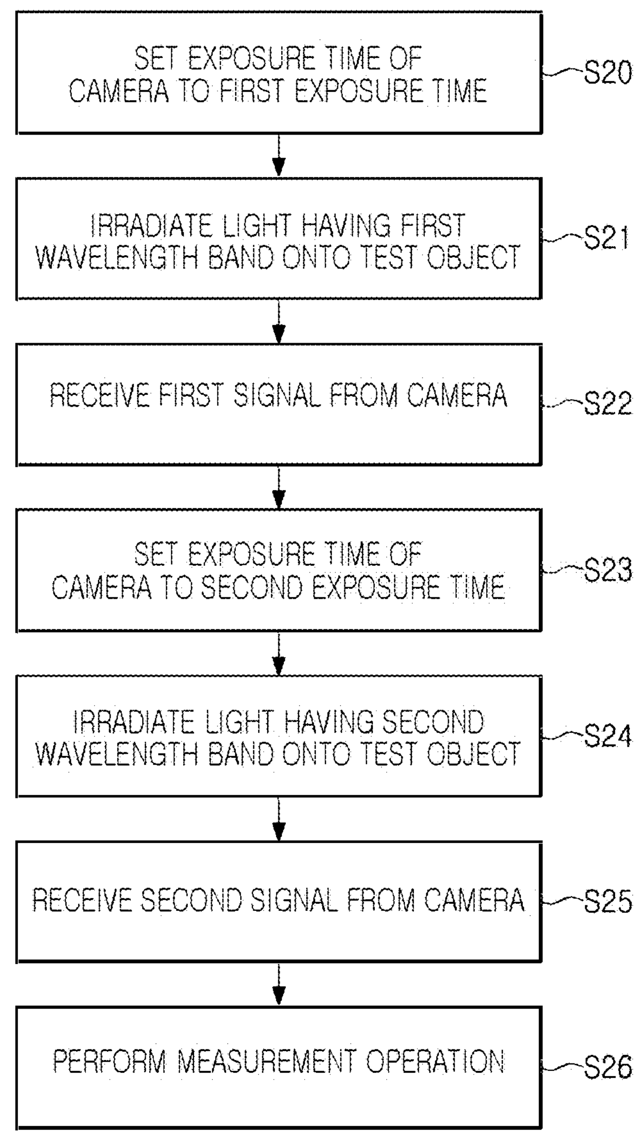

FIGS. 3 and 4 are flowcharts illustrating a method of operating a semiconductor measurement apparatus according to an example embodiment of the present disclosure.

First, referring to FIG. 3, a method of operating a semiconductor measurement apparatus according to an example embodiment of the present disclosure may start with setting, by a controller, an exposure time of a camera to a reference exposure time (S10). The reference exposure time may be determined in consideration of properties of an image sensor and a lens included in the camera. As an example, the reference exposure time may be determined to vary depending on a numerical aperture of the lens.

When the reference exposure time is determined, light having different wavelength bands may be irradiated onto a test object (S11). An illuminator of the semiconductor measurement apparatus may include a light source outputting light having a wide wavelength band, and a monochromator selecting light having a specific wavelength band from the light output by the light source, and emitting the light having the specific wavelength band. The reference exposure time determined in operation S10 may be constantly applied to the camera while the illuminator irradiates light onto the test object while changing a wavelength band. As an example, the test object may be a bare wafer. However, as described above, depending on an optical system of the semiconductor measurement apparatus, light of the illuminator may be directly irradiated onto the camera without being irradiated onto the test object.

A controller connected to the camera may receive a signal corresponding to each wavelength band from the camera (S12), and may measure an intensity of a signal in each of the wavelength bands (S13). As an example, the controller may detect an intensity of a first signal output when the camera receives light having a first wavelength band while the illuminator outputs light having the first wavelength band. In addition, the controller may detect an intensity of a second signal output when the camera receives light having a second wavelength band while the illuminator outputs the light having the second wavelength band. As described above, a constant exposure time of the camera may be maintained as a reference exposure time regardless of a wavelength band of light output by the illuminator.

As an example, the illuminator may output light having a first intensity in the first wavelength band, and may output light having a second intensity different from the first intensity in the second wavelength band. Accordingly, intensities of the first signal and the second signal output to the controller by the camera may be different from each other. As an example, when the first intensity is less than the second intensity, an intensity of the first signal output by the camera may also be less than an intensity of the second signal.

The controller may set an individual exposure time for each of the wavelength bands using a signal intensity measured for each of the wavelength bands in operation S13 (S14). In the above-described example, the controller may determine a first exposure time for the first wavelength band by comparing the intensity of the first signal with a target intensity, and may determine a second exposure time for the second wavelength band by comparing the intensity of the second signal with the target intensity. The first intensity of light output by the illuminator in the first wavelength band may be less than the second intensity of light output by the illuminator in the second wavelength band, such that the first exposure time for the first wavelength band may be determined to be longer than the second exposure time for the second wavelength band. One individual exposure time may be set for each of the plurality of wavelength bands. In this case, the number of the plurality of wavelength bands may be equal to the number of the plurality of individual exposure times.

Subsequently, referring to FIG. 4, a method of operating the semiconductor measurement apparatus according to an example embodiment of the present disclosure may start with setting, by a controller, an exposure time of a camera to a first exposure time (S20). The first exposure time may have a value different from that of a reference exposure time set as a basic or baseline value in the camera, and may be an exposure time matched to a case in which an illuminator outputs light having a first wavelength band. As an example, the controller may store, in an internal or external memory of the controller, an exposure time of the camera set for each of wavelength bands of light that may be output by the illuminator.

When the exposure time of the camera is set to the first exposure time, the controller may control the illuminator to irradiate the light having the first wavelength band onto a test object (S21). The test object may be a semiconductor substrate including a wafer. The light having the first wavelength band may be reflected from the test object or may be transmitted through the test object to be incident on the camera, and the controller may receive, from the camera, a first signal corresponding to the first wavelength band (S22).

Subsequently, the controller may set the exposure time of the camera to a second exposure time (S23). In some example embodiments, the second exposure time may be different from the first exposure time. When the exposure time of the camera is set to the second exposure time, the controller may control the illuminator to irradiate light having a second wavelength band onto the test object (S24). When the light having the second wavelength band reflected from the test object or transmitted through the test object is incident on the camera, the controller may receive a second signal from the camera (S25).

The controller may perform a measurement operation using the first signal corresponding to the first wavelength band and the second signal corresponding to the second wavelength band (S26). As an example, the controller may control the illuminator to output light of each of a plurality of wavelength bands including the first wavelength band and the second wavelength band, and may collect signals corresponding to the plurality of wavelength bands while changing the exposure time of the camera to an exposure time set for each wavelength band.

For each of the plurality of wavelength bands, the controller may calculate an intensity of light reflected from or transmitted through the test object, a reflectance of the light or of the object, and an intensity difference and/or a phase difference between polarization components included in the light. As an example, the intensity of light may be measured as an absolute intensity, unlike a reflectance determined by a relative ratio between an intensity of light emitted by the illuminator and the intensity of the light reflected from the test object. Alternatively, the controller may generate elements of a Mueller matrix that may be used for interpreting the light reflected from or transmitted through the test object. The controller may represent, as a spectrum distribution, at least one of an intensity of light for each of the plurality of wavelength bands, a reflectance of the light or of the object illuminated thereby, an intensity difference between polarization components, and a phase difference between the polarization components, and may measure, using the at least one of the intensity, the reflectance, the intensity difference, or the phase difference, a structure included in the test object. Alternatively, the structure included in the test object may be measured using elements of a Mueller matrix. In an example embodiment of the present disclosure, the exposure time of the camera may be set differently considering that an intensity of light output by the illuminator is different in at least some of the plurality of wavelength bands, and a deviation in signal-to-noise ratio of a signal received by the controller for each of the plurality of wavelength bands may be reduced or minimized. Accordingly, the semiconductor measurement apparatus having high repeatability and reproducibility may be implemented regardless of a wavelength band of light output by the illuminator.

Figure 5:
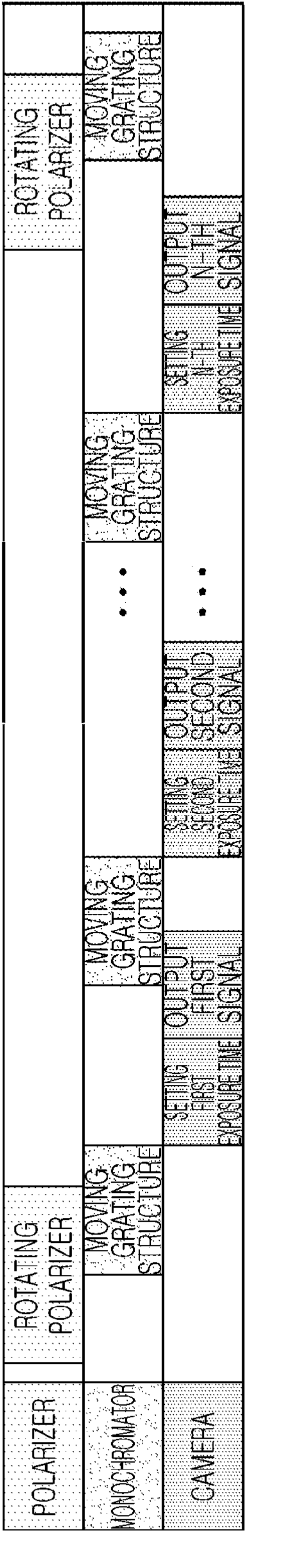
FIG. 5 is a diagram illustrating a method of operating a semiconductor measurement apparatus according to an example embodiment of the present disclosure.
Figure 6A:
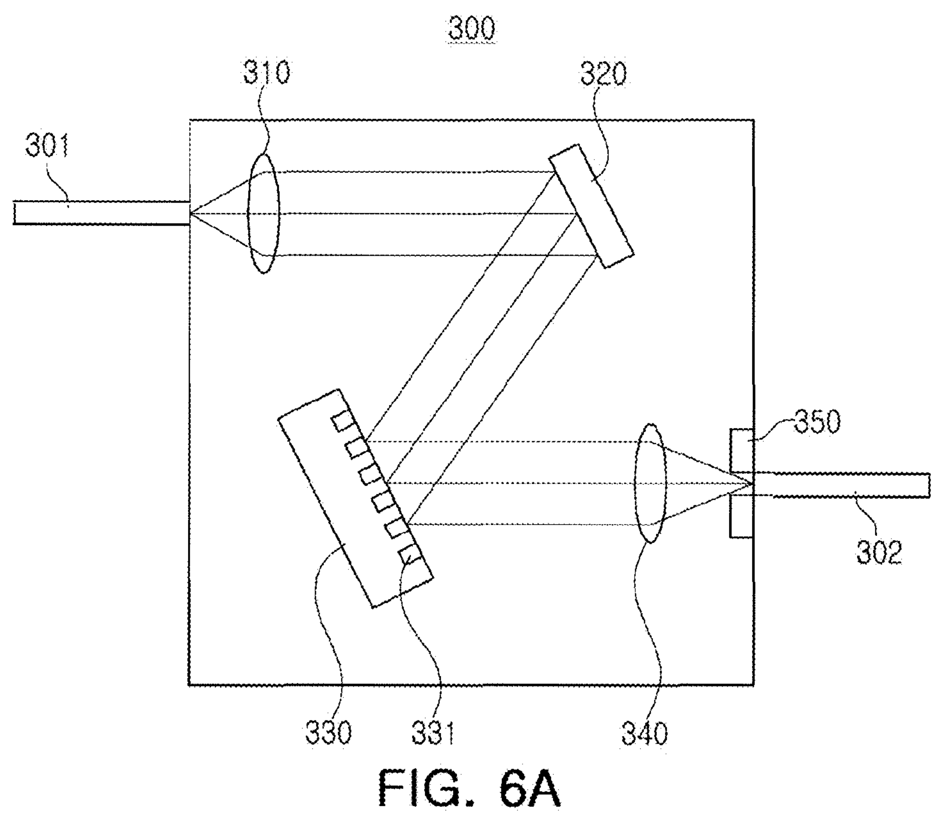
FIGS. 6A and 6B are diagrams illustrating an operation of a monochromator included in a semiconductor measurement apparatus according to an example embodiment of the present disclosure.
Figure 6B:
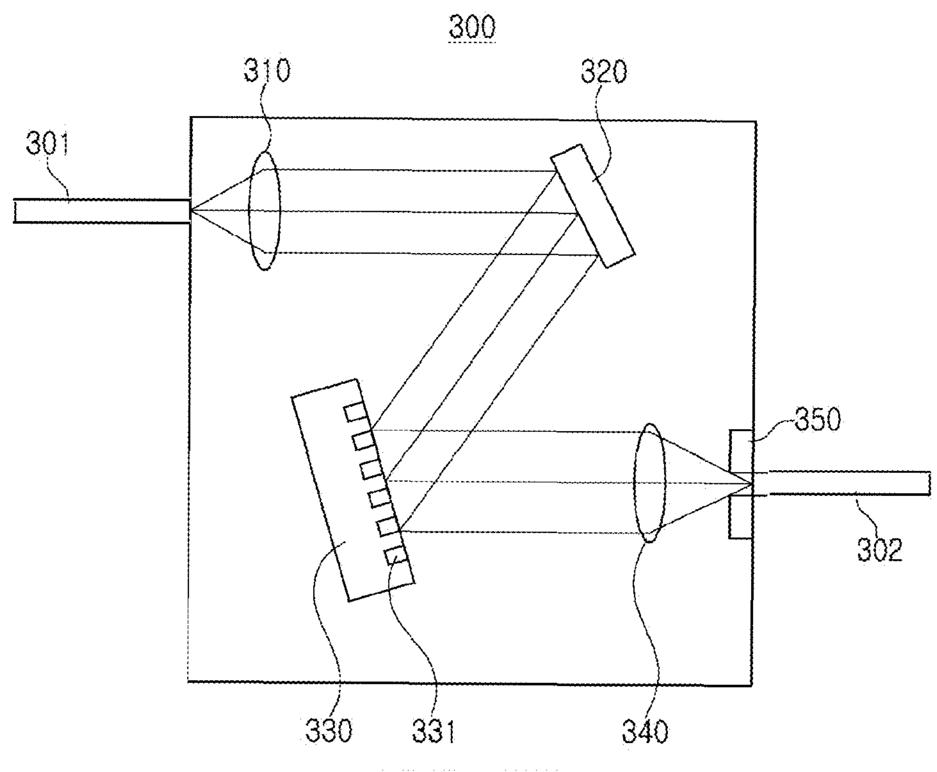

FIG. 5 is a diagram illustrating a method of operating a semiconductor measurement apparatus according to an example embodiment of the present disclosure. FIGS. 6A and 6B are diagrams illustrating an operation of a monochromator included in a semiconductor measurement apparatus according to an example embodiment of the present disclosure.

Referring first to FIG. 5, a method of operating a semiconductor measurement apparatus according to an example embodiment may start with controlling a polarizer. First, in order to polarize light at a desired angle, a controller may rotate a polarizer disposed on a path through which light output by an illuminator is incident on a test object.

When the polarizer is rotated, the controller may move a grating structure by controlling a monochromator included in the illuminator. As an example, the monochromator may include at least one grating structure, and light may be reflected from a surface of the grating structure to different paths depending on a wavelength band thereof. As an example, in light incident on the surface of the grating structure at a single incidence angle, light having a first wavelength band may be reflected at a first reflection angle, and light having a second wavelength band may be reflected at a second reflection angle different from the first reflection angle. Accordingly, the controller may change a wavelength band of light output from the monochromator to the outside by controlling a posture of the grating structure. An operation of the monochromator will be described in more detail with reference to FIGS. 6A and 6B.

Referring to FIGS. 6A and 6B, the monochromator 300 may be connected to a first optical fiber 301 providing an incidence path of light emitted from a light source, and a second optical fiber 302 providing an exit path of light emitted from the monochromator 300 to the outside. The monochromator 300 may include a collimator 310, a mirror 320, a grating structure 330, a condensing lens 340, and a slit structure 350.

The collimator 310 may parallelize a path of light incident through the first optical fiber 301, and the mirror 320 may reflect and allow the light to be incident on a surface of the grating structure 330. The grating structure 330 may be a device for separating light having a wide wavelength band into wavelength bands, and light incident on the surface of the grating structure 330 may be reflected at different reflection angles depending on a wavelength band thereof.

The condensing lens 340 may condense light reflected from the grating structure 330 at different reflection angles depending on a wavelength band thereof, and may allow the light to be incident on the slit structure 350. The light passing through the slit structure 350 may be output to the outside through the second optical fiber 302, and may be incident on a test object such as a wafer through, for example, a polarizer and a compensator. As illustrated in FIGS. 6A and 6B, a controller of the semiconductor measurement apparatus may change a wavelength band of light output to the second optical fiber 302 by changing a posture, for example, an angle, of the grating structure 330.

However, in some example embodiments, the monochromator 300 may include a prism instead of the grating structure 330. Light incident through the first optical fiber 301 may be decomposed by the prism into wavelength bands, and the controller may change a position of the prism or the condensing lens 340 disposed on a path of light reflected from the prism, thereby adjusting a wavelength band of light output through the second optical fiber 302. In addition, in some example embodiments, the monochromator 300 may include an optical filter capable of decomposing light into wavelength bands.

Referring back to FIG. 5, the controller of the semiconductor measurement apparatus may control the grating structure 330 of the monochromator 300 such that light having a first wavelength band is output from the illuminator. In addition, the controller may set an exposure time of a camera receiving light reflected from or transmitted through the test object to a first exposure time matched to the first wavelength band. The camera may receive light having the first wavelength band from the test object during the first exposure time to output a first signal.

While the first exposure time of the camera elapses and the first signal is output, the controller may control the posture of the grating structure such that light having a second wavelength band is irradiated from the illuminator onto the test object. When control of the posture of the grating structure is completed, the controller may change the exposure time of the camera to a second exposure time, and the camera may receive light reflected from or transmitted through the test object during the second exposure time to output a second signal.

The controller may repeat the above-described operation for each of first to n-th wavelength bands that may be provided by the illuminator, thereby receiving first to n-th signals from the camera. The controller may measure, using the first to n-th signals received for the first to n-th wavelength bands, an intensity of light having each of the first to n-th wavelength bands, a reflectance of the light or of the object, an intensity difference between polarization components, a phase difference between the polarization components, elements of a Mueller matrix, and the like, overlays, critical dimensions, and the like of structures formed on the test object. In addition, the controller may rotate the polarizer while receiving the n-th signal to set light including a different polarization component to be incident on the test object, and may then repeat the above-described operation for each of the first to n-th wavelength bands.

Figure 7A:
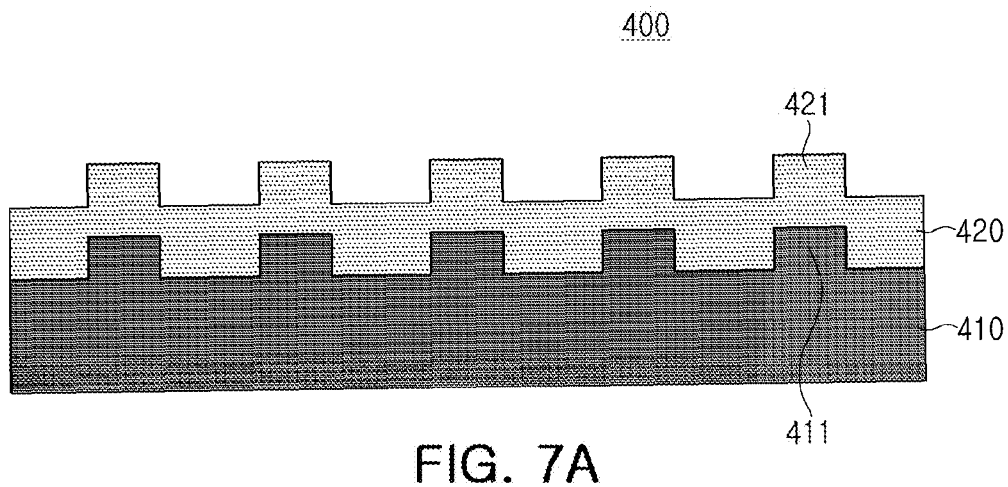
FIGS. 7A, 7B, and 7C are diagrams illustrating a measurement method using a semiconductor measurement apparatus according to an example embodiment of the present disclosure.
Figure 7B:
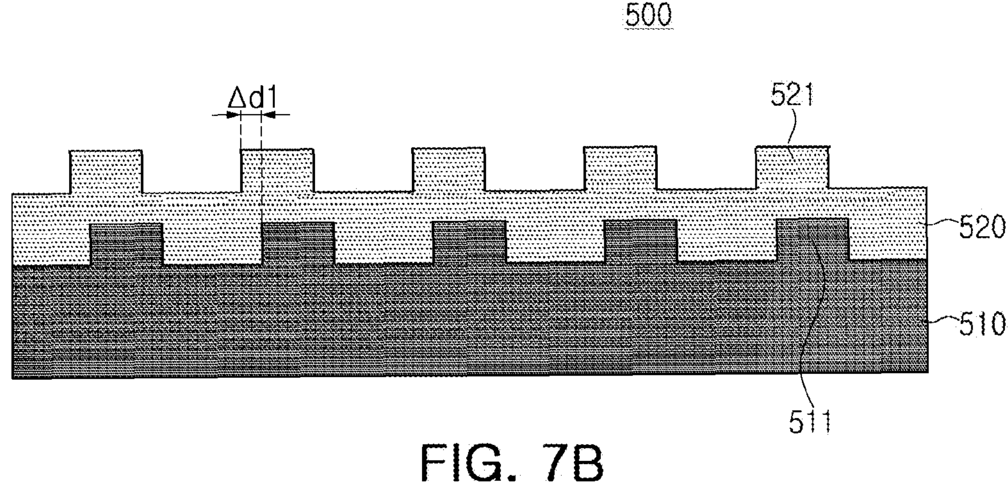
Figure 7C:
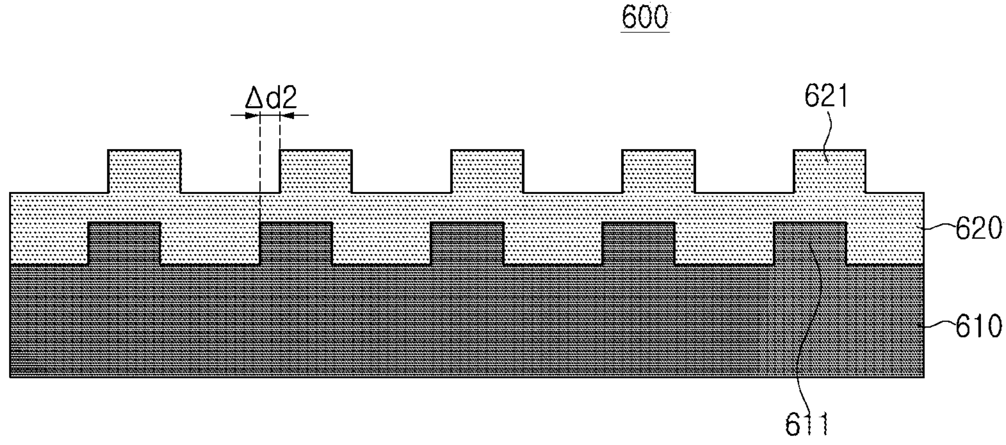

FIGS. 7A to 7C are diagrams illustrating a measurement method using a semiconductor measurement apparatus according to an example embodiment of the present disclosure.

FIGS. 7A to 7C may be diagrams illustrating partial regions of an object to be measured by a semiconductor measurement apparatus. First, referring to FIG. 7A, a first test object 400 may include a first layer 410 and a second layer 420 stacked on each other, and first structures 411 may be formed on the first layer 410, and second structures 421 may be formed on the second layer 420. As illustrated in FIG. 7A, in the first test object 400, the first structures 411 and the second structures 421 may be accurately aligned without being offset in a specific direction.

Subsequently, referring to FIG. 7B, a second test object 500 may include a second layer 510 and a second layer 520 stacked on each other. In the example embodiment illustrated in FIG. 7B, first structures 511 and second structures 521 may be offset in a left direction. As an example, when compared to the example embodiment illustrated in FIG. 7A, in the example embodiment illustrated in FIG. 7B, the second structures 521 may be formed to be skewed to the left by a predetermined first offset Δd1 with respect to the first structures 511.

Referring to FIG. 7C, a third test object 600 may include a first layer 610 and a second layer 620 being vertically stacked. First structures 611 may be formed on the first layer 610, and second structures 621 may be formed on the second layer 620. In the example embodiment illustrated in FIG. 7C, the first structures 611 and the second structures 621 may be offset in a right direction. As an example, when compared to the example embodiment illustrated in FIG. 7A, in the example embodiment illustrated in FIG. 7C, the second structures 621 may be formed to be skewed to the right by a second offset Δd2 with respect to the first structures 611.

As illustrated in FIGS. 7A to 7C, the semiconductor measurement apparatus may measure an overlay, an alignment state of structures formed on each of layers stacked on each other. As an example, light reflected or transmitted by each of the first test object 400, the second test object 500, and the third test object 600 may be detected with a camera to represent, as a spectrum distribution, a phase difference and/or an intensity difference between wavelength components according to a wavelength band, and the spectrum distribution may vary depending on the overlay. Alternatively, an intensity of light and/or a reflectance of the test object 400, 500, 600 indicated thereby according to a wavelength band may vary depending on the overlay.

In addition, in an example embodiment of the present disclosure, considering that light output of a light source included in an illuminator may vary depending on a wavelength band thereof, an exposure time of the camera may be set differently depending on a wavelength band of light output to the test objects 400, 500, and 600 by the illuminator. Accordingly, a signal having a high signal-to-noise ratio may be acquired from the camera regardless of the wavelength band of light irradiated onto the test objects 400, 500, and 600, thereby accurately measuring the overlay.

FIGS. 8, 9A, 9B, 10A, and 10B are diagrams illustrating an operation of a semiconductor measurement apparatus according to an example embodiment of the present disclosure.

Figure 8:
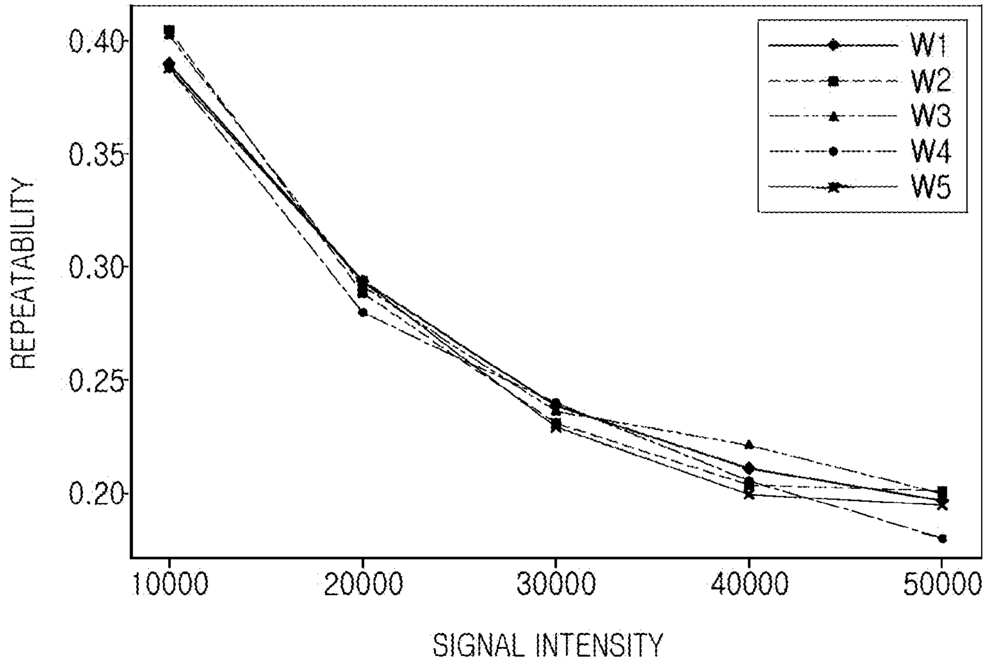
FIGS. 8, 9A, 9B, 10A, and 10B are diagrams illustrating an operation of a semiconductor measurement apparatus according to an example embodiment of the present disclosure.

FIG. 8 is a graph illustrating repeatability according to an intensity of a signal detected by a camera when light having each of first to fifth wavelength bands W1 to W5 is irradiated onto a test object. In the graph of FIG. 8, a horizontal axis may represent an intensity of a signal acquired by a controller from the camera of the semiconductor measurement apparatus, and a vertical axis may represent repeatability.

In the example embodiment illustrated in FIG. 8, each of the first to fifth wavelength bands W1 to W5 may all belong to an ultraviolet wavelength band, and the first wavelength band W1 may be a shortest wavelength band, and the fifth wavelength band W5 may be a longest wavelength band. The repeatability represented by the vertical axis may be a parameter representing a deviation in intensity of a signal repeatedly output by the camera while light having the same wavelength band is irradiated onto the same test object.

As an example, the repeatability may have a larger value as the deviation in the intensity of the signal output by the camera increases, and the repeatability may have a smaller value as the deviation in the intensity of the signal output by the camera decreases. In other words, as the repeatability has a smaller value, a deviation in intensity of a signal output by the semiconductor measurement apparatus in the same test environment may decrease, and as a result, the semiconductor measurement apparatus may have improved performance.

Referring to FIG. 8, in all of the first to fifth wavelength bands W1 to W5, the repeatability may be improved as the intensity of the signal output by the camera increases. As an example, referring to a graph corresponding to the first wavelength band W1, the repeatability may be improved from 0.4 to 0.2 as the signal intensity increases.

In an example embodiment of the present disclosure, an exposure time of the camera may be set differently considering that an intensity of light emitted by an illuminator varies in each of the wavelength bands W1 to W5. Accordingly, while light of each of the wavelength bands W1 to W5 is irradiated onto the test object and is reflected from or transmitted through the test object, the intensity of the signal output by the camera may be more consistent or otherwise improved. As illustrated in FIG. 8, the repeatability or consistency of the semiconductor measurement apparatus may be improved.

Figure 9A:
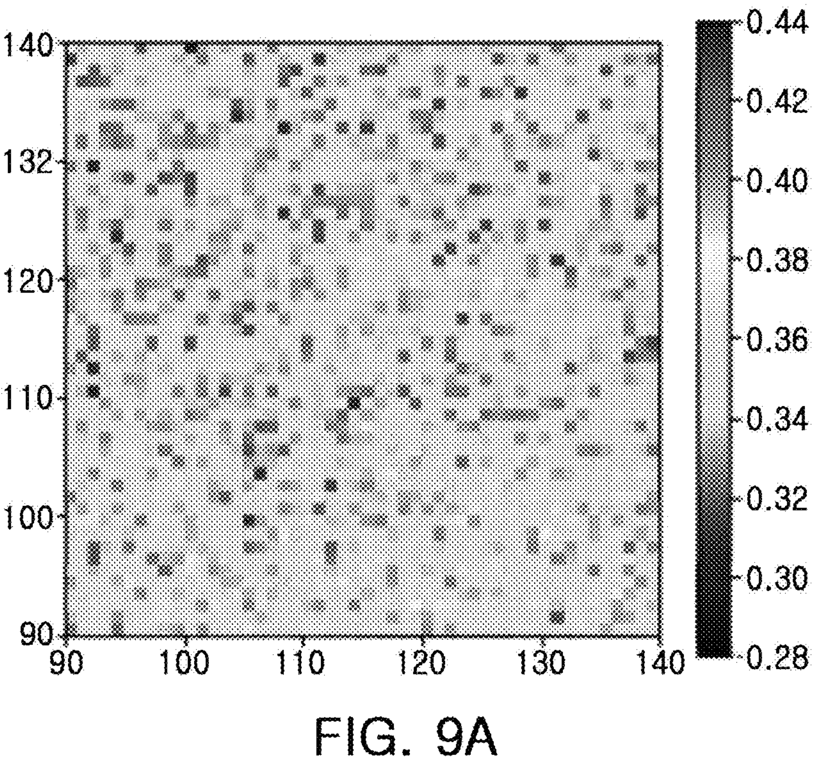
Figure 9B:
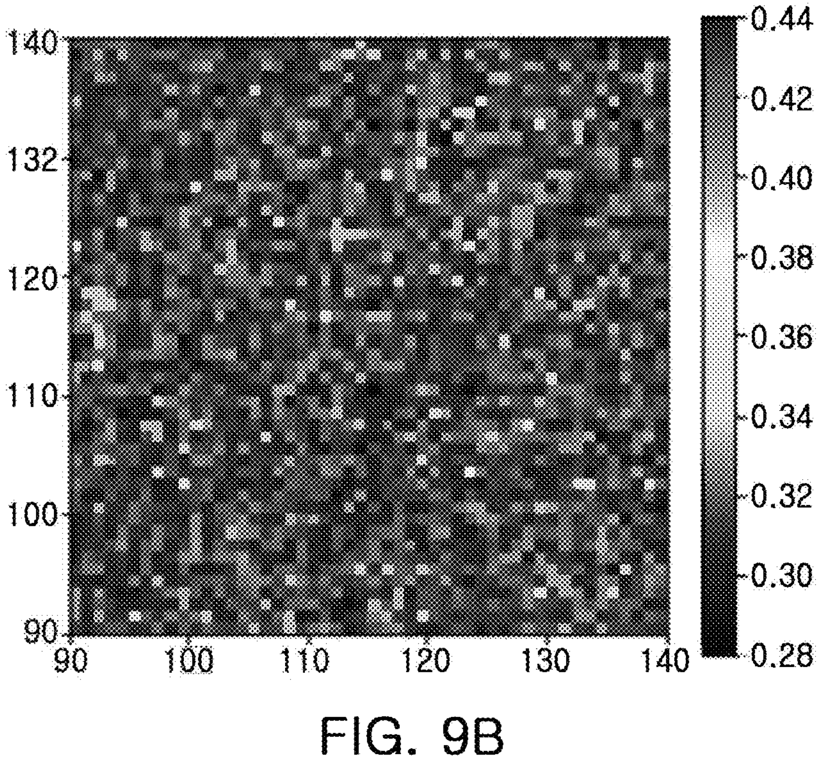

Each of FIGS. 9A and 9B may be an image representing 3*sigma of a pixel signal output by each of pixels of an image sensor included in the camera of the semiconductor measurement apparatus according to an example embodiment of the present disclosure.

FIG. 9A may be an image representing 3*sigma of a pixel signal output by the image sensor when a constant exposure time of the camera is maintained regardless of a wavelength band of light irradiated onto the test object. Conversely, FIG. 9B may be an image representing 3*sigma of a pixel signal output by the image sensor when the exposure time of the camera is adjusted depending on a wavelength band of light. As described above, in the example embodiment corresponding to FIG. 9B, the controller may increase the exposure time of the camera in a wavelength band in which the intensity of light output by the illuminator is relatively weak, and may reduce the exposure time of the camera in a wavelength band in which the intensity of light is relatively strong.

Each of pixels in each image illustrated in FIGS. 9A and 9B may correspond to each of pixels of the image sensor included in the camera. Each of the images of FIGS. 9A and 9B may represent a deviation between pixel signals output by respective pixels of the image sensor included in the camera while light having a specific wavelength band is irradiated onto the test object. As illustrated in FIGS. 9A and 9B, the deviation between the pixel signals output by the respective pixels of the image sensor may be smaller when the exposure time of the camera is dynamically adjusted depending on the wavelength band of light irradiated onto the test object.

In the semiconductor measurement apparatus according to an example embodiment of the present disclosure, in order to interpret a signal received from the camera, the controller may generate a Mueller matrix corresponding to light reflected from or transmitted through the test object to be incident on the camera. Each of FIGS. 10A and 10B may be diagrams illustrating repeatability of some of elements of the Mueller matrix generated by the controller so as to analyze structures included in the test object from the signal received from the camera.

Figure 10A:
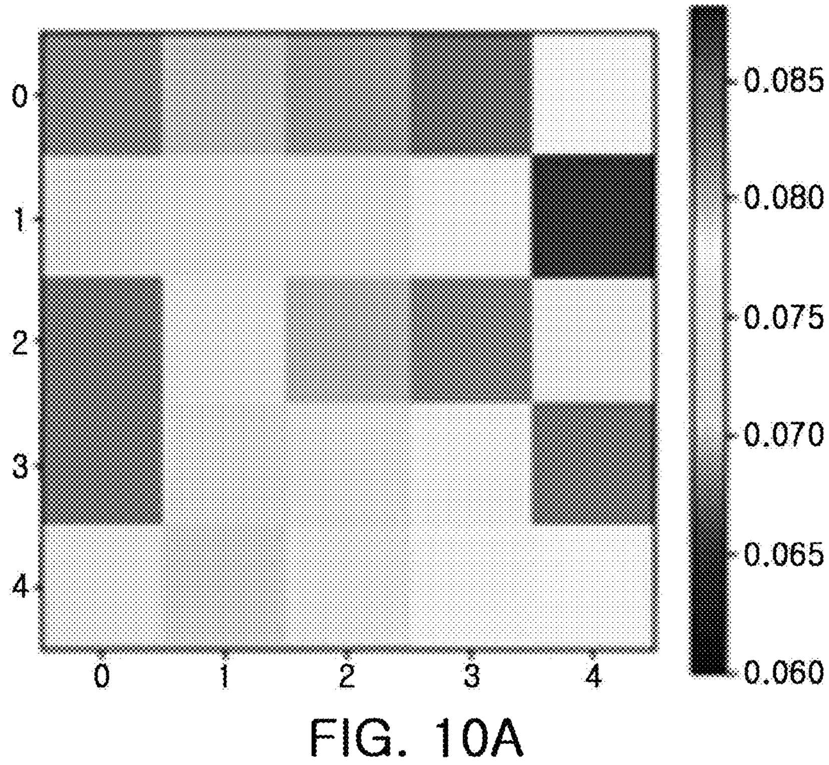
Figure 10B:
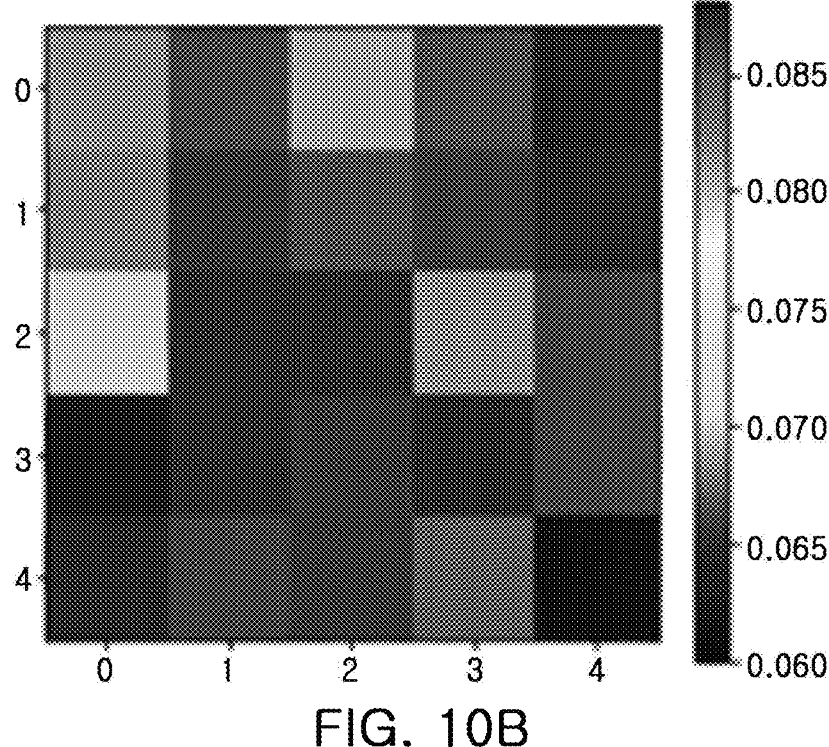

FIG. 10A may be an image representing 3*sigma of some elements of the Mueller matrix generated by the controller when a constant exposure time of the camera is maintained regardless of the wavelength band of light irradiated onto the test object. FIG. 10B may be an image representing 3*sigma of some elements of the Mueller matrix generated by the controller when the exposure time of the camera is adjusted depending on the wavelength band of light. The controller may set the exposure time of the camera to be long in a wavelength band in which the intensity of light emitted by the illuminator is relatively weak, and may set the exposure time of the camera to be short in a wavelength band in which the intensity of light is relatively strong.

As illustrated in FIGS. 10A and 10B, a deviation between the elements of the Mueller matrix generated by the controller using a signal received from the camera may be smaller when the exposure time of the camera is dynamically adjusted depending on the wavelength band of light irradiated onto the test object. As an example, each of FIGS. 10A and 10B may represent a value obtained by adding M13 and M31 among the elements of the Mueller matrix. Thus, in addition to a deviation between intensities of signals output by the respective pixels of the image sensor included in the camera, the repeatability of the elements of the Mueller matrix generated by the controller so as to measure the structures included in the test object may be improved, thereby improving performance of the semiconductor measurement apparatus.

Figure 11:
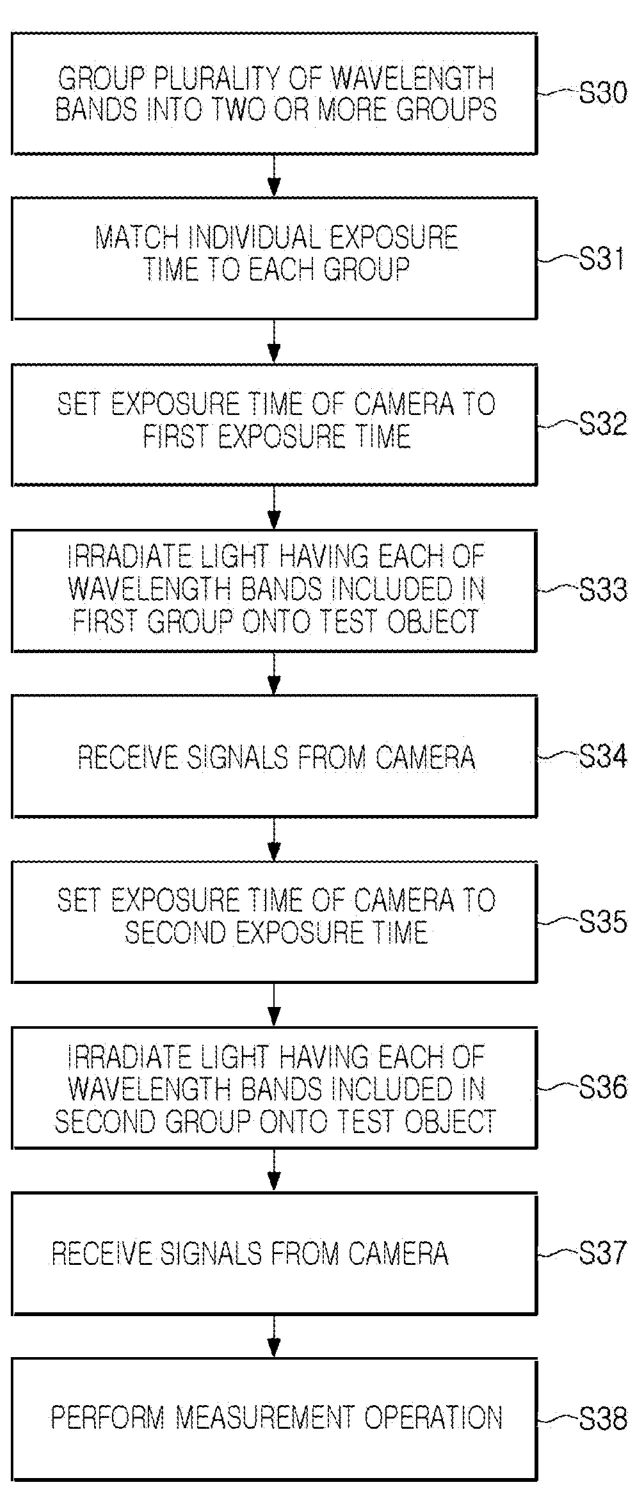
FIG. 11 is a flowchart illustrating a method of operating a semiconductor measurement apparatus according to an example embodiment of the present disclosure.

FIG. 11 is a flowchart illustrating a method of operating a semiconductor measurement apparatus according to an example embodiment of the present disclosure.

Referring to FIG. 11, an operation of the semiconductor measurement apparatus according to an example embodiment of the present disclosure may start with grouping a plurality of wavelength bands into two or more groups (S30). A wavelength band of light output by a light source included in an illuminator may be adjusted by a predetermined unit wavelength, and a controller of the semiconductor measurement apparatus may group two or more adjacent wavelength bands into one group. For example, when the wavelength band of light output by the light source may be adjusted by 5 nm, the controller of the semiconductor measurement apparatus may group wavelength bands of 370 nm, 375 nm, and 380 nm into one first group. In addition, wavelength bands of 385 nm, 390 nm, and 395 nm may be grouped into one second group.

However, in some example embodiments, the number of wavelength bands included in at least some of the plurality of groups may be different. For example, the controller may configure a first group only with a wavelength band of 370 nm, and may group wavelength bands of 375 nm and 380 nm into a second group. In addition, a third group may include wavelength bands of 385 nm, 390 nm, and 395 nm.

The controller may match an individual exposure time to each group in which a plurality of wavelength bands are grouped (S31). As an example, the controller may match a first exposure time to the first group, and match a second exposure time, different from the first exposure time, to the second group. The controller may match an exposure time to each group with reference to an intensity at which the illuminator outputs light having a wavelength band included in each group. One individual exposure time may be matched to each group, such that the number of individual exposure times may be less than the number of the plurality of wavelength bands.

In some example embodiments, a method in which the controller determines the exposure time matched to each group may vary. As an example, the controller may determine the exposure time in consideration of output of light in an intermediate wavelength band among wavelength bands included in each group. The controller may set an exposure time of a camera as a reference exposure time, and may control the illuminator to output light of 375 nm, an intermediate wavelength band of the first group. The controller may determine the first exposure time to be matched to the first group by comparing an intensity of a signal acquired from the camera, receiving light of 375 nm, with a predetermined target signal intensity. For the second group, the controller may determine the second exposure time to be matched to the second group using an intensity of a signal acquired from the camera while the illuminator outputs light of 390 nm.

Alternatively, exposure times for two or more wavelength bands included in each group may be calculated, and an average thereof may also be determined as an individual exposure time for each group. For example, the controller may compare an intensity of a signal received from the camera with the target signal intensity while the illuminator respectively outputs light of 370 nm, 375 nm, and 380 nm to determine an exposure time matched to each of wavelength bands of 370 nm, 375 nm, and 380 nm. For example, when the exposure time is determined to be 5.3 ms for a wavelength band of 370 nm, the exposure time is determined to be 5.1 ms for a wavelength band of 375 nm, and the exposure time is determined to be 4.6 ms for a wavelength band of 380 nm, the controller may determine the first exposure time matched to the first group to be 5.0 ms.

The individual exposure time matched to each group may be stored in an internal or external memory of the controller. Thereafter, when measurement of the test object starts, the controller of the semiconductor measurement apparatus may set the exposure time of the camera to the first exposure time (S32). While maintaining the exposure time of the camera as the first exposure time, the controller may control the illuminator such that light having each of wavelength bands included in the first group is irradiated onto the test object (S33), and may receive signals from the camera. (S34).

When all lights having the wavelength bands included in the first group are irradiated onto the test object, the controller may set the exposure time of the camera to the second exposure time (S35). In addition, while maintaining the exposure time of the camera as the second exposure time, the controller may control the illuminator such that light having each of the wavelength bands included in the second group is irradiated onto the test object (S36), and may receive signals from the camera. (S37).

The controller may perform a measurement operation using the signals received from the camera (S38). In the measurement operation, overlays, critical dimensions, and the like of structures formed on the target object may be determined. The controller may acquire an intensity difference and a phase difference between polarization components included in light reflected from or transmitted through the test object, or may acquire an intensity of and/or a reflectance indicated by the light, using the signals received from the camera. The controller may perform a measurement operation using at least one of the intensity of the light, the reflectance of the test object as indicated by the light, and the intensity difference and phase difference between the polarization components.

FIGS. 12 to 15 are diagrams illustrating an operation of a semiconductor measurement apparatus according to an example embodiment of the present disclosure.

Figure 12:
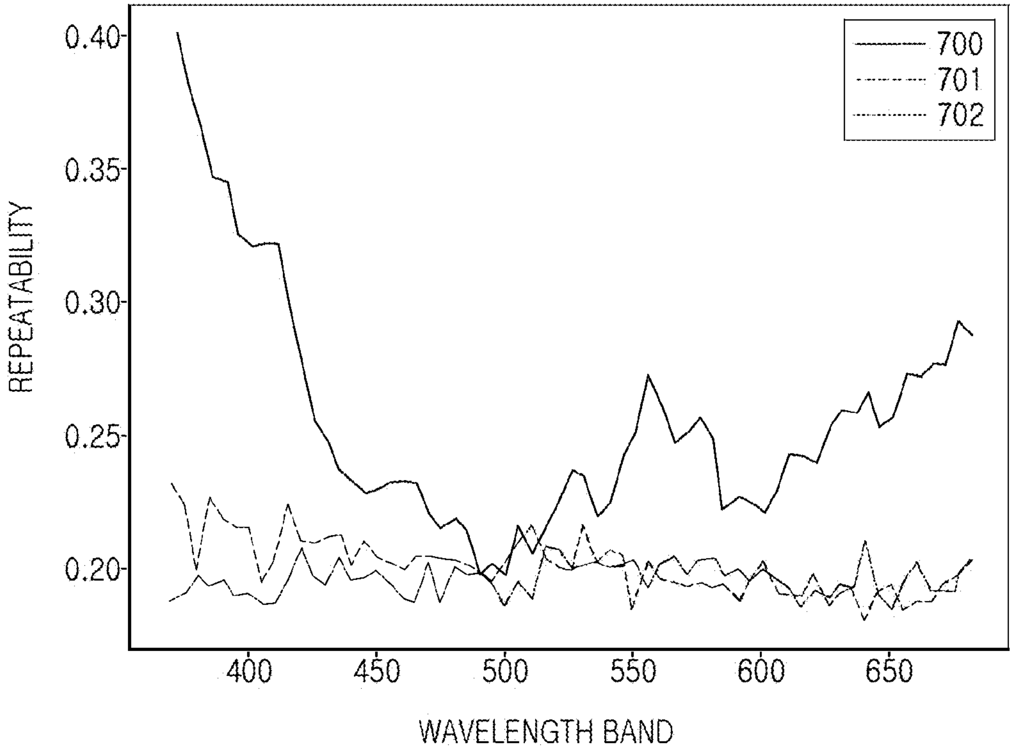
FIGS. 12, 13, 14, and 15 are diagrams illustrating an operation of a semiconductor measurement apparatus according to an example embodiment of the present disclosure.

FIG. 12 is a diagram illustrating repeatability according to a method of controlling, by a semiconductor measurement apparatus, an exposure time of a camera. In the example embodiment illustrated in FIG. 12, a first graph 700 may correspond to a case in which the exposure time of the camera is fixed regardless of a wavelength band of light irradiated onto a test object by an illuminator. Referring to the first graph 700, repeatability may be degraded in a wavelength band in which intensity of light output by the illuminator is weakened, for example, an ultraviolet wavelength band, a wavelength band near 550 nm and 650 nm, and the like. This may be because the intensity of light output by the illuminator decreases, such that a signal-to-noise ratio of the signal output by the camera to a controller may be degraded.

A second graph 701 may correspond to a case in which wavelength bands of light that may be output by the illuminator are grouped into a plurality of groups. In an example embodiment corresponding to the second graph 701, the exposure time of the camera may not change while light having two or more wavelength bands included in each group is irradiated onto the test object. Referring to the second graph 701, the repeatability of the semiconductor measurement apparatus may be improved, as compared to the first graph 700 in which the exposure time of the camera is fixed to one for all wavelength bands.

The third graph 702 may correspond to a case in which an exposure time is individually set for each of wavelength bands of light that may be output by the illuminator. Accordingly, the repeatability of the semiconductor measurement apparatus in most of the wavelength bands may be most excellent in an example embodiment corresponding to the third graph 702.

However, in the example embodiment of the third graph 702 in which the exposure time of the camera is reset whenever a wavelength band of light output by the illuminator changes, time required to perform a measurement operation on the test object may be longer, as compared to the example embodiment of the second graph 701. As an example, when the measurement operation is performed as in the example embodiment of the second graph 701 by grouping three adjacent wavelength bands into one group, the time required for the measurement operation may be reduced about by about 10% or more, as compared to the example embodiment of the third graph 702.

Figure 13:
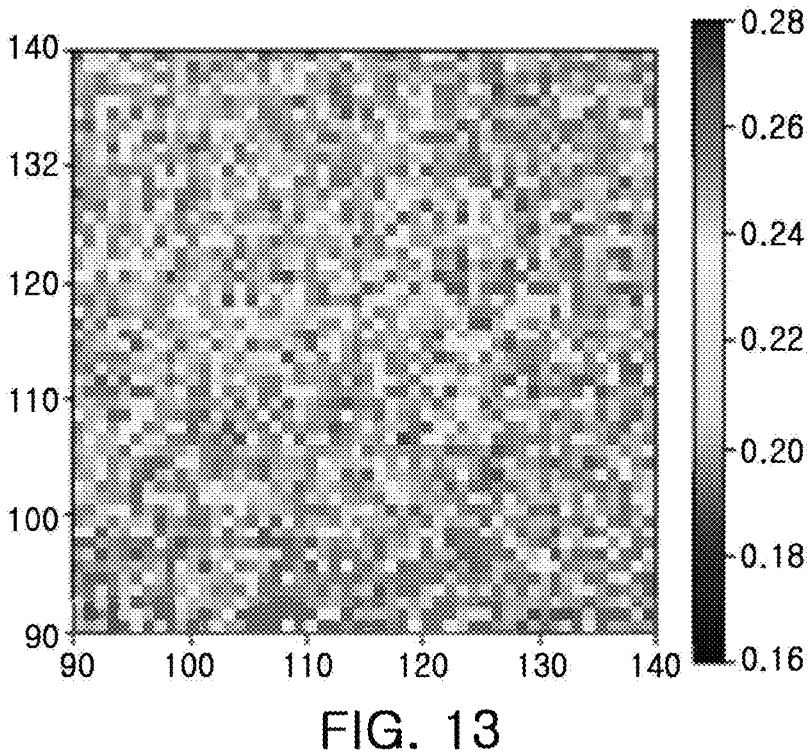
Figure 14:
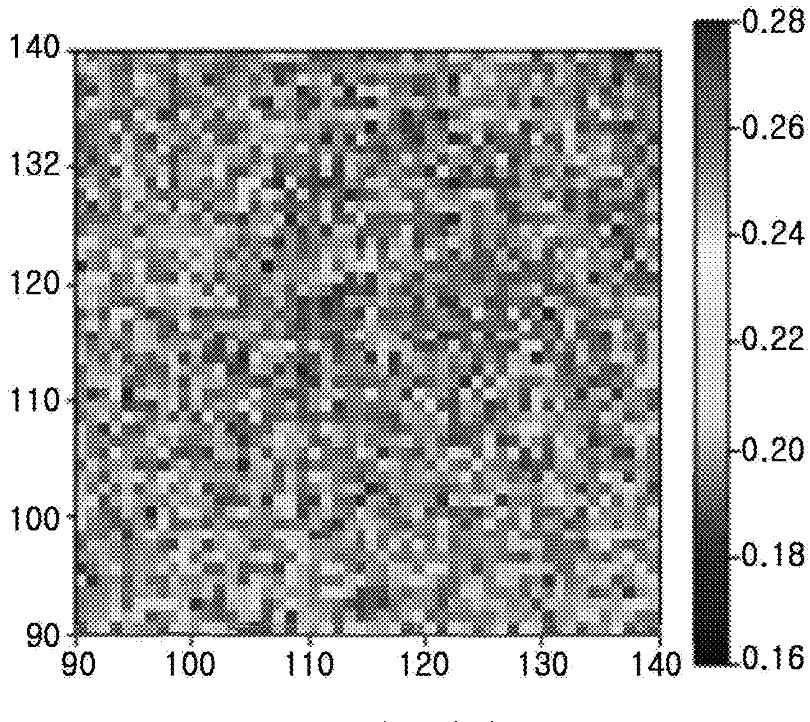
Figure 15:
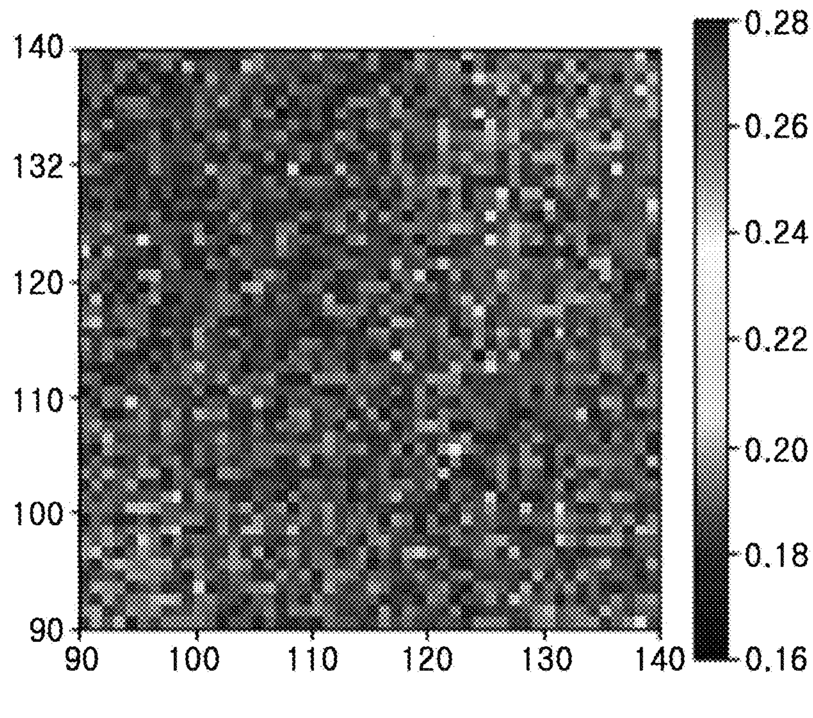

Each of FIGS. 13 to 15 may be an image representing 3*sigma of a pixel signal output by each of pixels of an image sensor included in the camera in the semiconductor measurement apparatus according to an example embodiment of the present disclosure.

FIG. 13 may correspond to an example embodiment in which a constant exposure time of the camera is maintained regardless of a wavelength band of light irradiated onto the test object. As an example, FIG. 13 may represent 3*sigma of a pixel signal output by the image sensor in the semiconductor measurement apparatus operating according to the example embodiment of the first graph 700 illustrated in FIG. 12.

FIG. 14 may correspond to an example embodiment in which the exposure time of the camera is equally applied by grouping, into one group, two or more adjacent wavelength bands among wavelength bands of light irradiated onto the target object. The controller of the semiconductor measurement apparatus may differently apply the exposure time of the camera in units of groups respectively including two or more wavelength bands. FIG. 14 may represent 3*sigma of a pixel signal output by the image sensor in the semiconductor measurement apparatus operating according to the example embodiment of the second graph 701 illustrated in FIG. 12.

FIG. 15 may correspond to an example embodiment in which the exposure time of the camera is differently applied to each of wavelength bands of light irradiated on the target object. The controller of the semiconductor measurement apparatus may differently set the exposure time of the camera for each of the wavelength bands. FIG. 15 may represent 3*sigma of a pixel signal output by the image sensor in the semiconductor measurement apparatus operating according to the example embodiment of the third graph 702 illustrated in FIG. 12.

As illustrated in FIGS. 13 to 15, the pixel signal output by the image sensor may have the worst repeatability in the example embodiment corresponding to the first graph 700, and may have the best or most excellent repeatability in the example embodiment corresponding to the third graph 702. However, when the exposure time of the camera is reset whenever the wavelength band of light output by the illuminator changes, the time required for the measurement operation may increase. Accordingly, if necessary, the semiconductor measurement apparatus may be controlled as in the example embodiment corresponding to the second graph 701 in consideration of both the time required for the measurement operation and the accuracy of the measurement operation.

While example embodiments have been shown and described above, it will be apparent to those skilled in the art that modifications and variations could be made without departing from the scope of the present disclosure as defined by the appended claims.

What is claimed is:

1. A semiconductor measurement apparatus comprising:

an illuminator configured to emit output light;

a stage configured to position a semiconductor test object such that the output light from the illuminator is incident thereon;

a camera configured to receive light that is reflected or scattered from the semiconductor test object or is transmitted through the semiconductor test object; and a controller configured to measure an intensity of a signal output by the camera, in response to setting an exposure time of the camera to a reference exposure time and setting a wavelength band of the output light from the illuminator to each of a plurality of wavelength bands, wherein the controller is configured to compare intensity of respective signals output by the camera in each of the plurality of wavelength bands with a predetermined target intensity and determine respective exposure times of the camera responsive thereto, wherein the respective exposure times for at least some of the plurality of wavelength bands are different from each other such that the plurality of wavelength bands produced by the illuminator each have substantially a same intensity to the camera.

2. The semiconductor measurement apparatus of claim 1, wherein the semiconductor test object is a bare wafer.

3. The semiconductor measurement apparatus of claim 2, wherein the controller is configured to measure a critical dimension of a structure included in a semiconductor object different from the bare wafer, and formed by a semiconductor process.

4. The semiconductor measurement apparatus of claim 2, wherein the controller is configured to measure overlays of a plurality of structures included in a semiconductor object different from the bare wafer, and wherein the overlays correspond to an alignment state of the plurality of structures formed on each of layers included in the semiconductor object and stacked on each other.

5. The semiconductor measurement apparatus of claim 1, wherein the plurality of wavelength bands include a first wavelength band and a second wavelength band different from the first wavelength band, and wherein the controller is configured to set the exposure time of the camera for the first wavelength band to a first exposure time among the respective exposure times, and to set the exposure time of the camera for the second wavelength band to a second exposure time among the respective exposure times, wherein the second exposure time is different from the first exposure time.

6. The semiconductor measurement apparatus of claim 1, wherein the plurality of wavelength bands include two or more first wavelength bands grouped into a first group and two or more second wavelength bands grouped into a second group, and wherein the controller is configured to determine the respective exposure times of the camera as including a first exposure time for the two or more first wavelength bands, and a second exposure time for the two or more second wavelength bands.

7. The semiconductor measurement apparatus of claim 6, wherein the first exposure time is determined based on a first intensity of a first signal output from the camera in response to receiving the output light comprising one of the two or more first wavelength bands and the predetermined target intensity, and wherein the second exposure time is determined based on a second intensity of a second signal output from the camera in response to receiving the output light comprising one of the two or more second wavelength bands and the predetermined target intensity.

8. The semiconductor measurement apparatus of claim 6, wherein the first exposure time is an average of exposure times determined based on the intensity of the respective signals output from the camera in response to receiving the output light comprising each of the two or more first wavelength bands and the predetermined target intensity.

9. The semiconductor measurement apparatus of claim 1, wherein the illuminator includes a light source and a monochromator configured to adjust a wavelength band of primary light output by the light source to one of the plurality of wavelength bands, and to emit the output light comprising the one of the plurality of wavelength bands.

10. The semiconductor measurement apparatus of claim 9, wherein the monochromator includes a grating structure configured to reflect the primary light output by the light source, and a slit structure configured to allow the light reflected from the grating structure to pass through, and wherein the controller is configured to adjust the wavelength band of the primary light by changing a posture of the grating structure.

11. The semiconductor measurement apparatus of claim 1, wherein, when the camera receives the output light that is emitted from the illuminator and is reflected or scattered from the semiconductor test object or is transmitted through the the semiconductor test object, the controller is configured to determine, based on an intensity of a first signal generated by the camera in response to the output light, a plurality of individual exposure times respectively matched to the plurality of wavelength bands, wherein the controller is configured to acquire a second signal from the camera while setting an exposure time of the camera to a respective one of the plurality of individual exposure times and controlling the illuminator to emit the output light having a wavelength band among the plurality of wavelength bands, which is matched to the respective one of the plurality of individual exposure times that is set in the camera, and wherein the controller is configured to measure, based on the second signal that was acquired from the camera, a plurality of structures that reflect, scatter or transmit the output light.

12. The semiconductor measurement apparatus of claim 11, wherein the controller is configured to generate, using the second signal, at least one of an intensity difference or a phase difference between polarization components included in light incident on the camera, a reflectance based on the light incident on the camera, an intensity of the light incident on the camera, or elements of a Mueller matrix corresponding to the light incident on the camera.

13. The semiconductor measurement apparatus of claim 9, wherein the illuminator is configured to provide the output light comprising first light having a first wavelength band and second light having a second wavelength band that is different from the first wavelength band;

wherein the controller is configured to control the illuminator and the camera, and wherein the controller is configured to set an exposure time of the camera to a first exposure time while the illuminator outputs the first light having the first wavelength band, and to set the exposure time of the camera to a second exposure time, different from the first exposure time, while the illuminator outputs the second light having the second wavelength band.

14. The semiconductor measurement apparatus of claim 13, wherein the controller is configured to measure the intensity of the signal output by the camera, while the illuminator is configured to emit the output light to a first area of the semiconductor test object, and wherein the controller is configured to measure a critical dimension of a structure included in a second area of the semiconductor test object, and formed by a semiconductor process, and wherein the second area is different from the first area.

15. The semiconductor measurement apparatus of claim 13, wherein the illuminator further includes:

at least one light source configured to output primary light having a plurality of wavelength bands including the first wavelength band and the second wavelength band; and a monochromator configured to decompose primary light output from the at least one light source into the plurality of wavelength bands, and to select and output light having one wavelength band among the plurality of wavelength bands as the output light.

16. The semiconductor measurement apparatus of claim 15, wherein the monochromator includes a grating structure configured to decompose the primary light output from the at least one light source into the plurality of wavelength bands, wherein the controller is configured to select a wavelength band among the plurality of wavelength bands by adjusting at least one of a posture of the grating structure or an angle at which the at least one light source outputs the primary light, and wherein the controller is configured to change the exposure time of the camera depending on at least one of the posture of the grating structure or the angle at which the at least one light source outputs the primary light.

17. The semiconductor measurement apparatus of claim 15, wherein the monochromator includes at least one of a prism configured to decompose the primary light output by the at least one light source into the plurality of wavelength bands, or an optical filter.

18. The semiconductor measurement apparatus of claim 1, wherein the semiconductor test object includes a plurality of first structures, and wherein the controller is configured to measure a critical dimension of a second structure included in a semiconductor object different from the semiconductor test object, and formed by a semiconductor process.

19. The semiconductor measurement apparatus of claim 1, wherein the semiconductor test object includes a plurality of first structures, wherein the controller is configured to measure overlays of a plurality of second structures included in a semiconductor object different from the semiconductor test object, and wherein the overlays correspond to an alignment state of the plurality of second structures formed on each of layers included in the semiconductor object and stacked on each other.

20. The semiconductor measurement apparatus of claim 1, wherein the controller is configured to measure the intensity of the signal output by the camera, while the illuminator is configured to emit the output light to a first area of the semiconductor test object, wherein the controller is configured to measure overlays of a plurality of structures included in a second area of the semiconductor test object, and the second area is different from the first area, and wherein the overlays correspond to an alignment state of the plurality of structures formed on each of layers included in the semiconductor test object and stacked on each other.

* * * * *